(12) United States Patent
Power, III

(10) Patent No.: US 10,544,775 B2
(45) Date of Patent: Jan. 28, 2020

(54) HYDROELECTRIC ENERGY SYSTEMS, AND RELATED COMPONENTS AND METHODS

(71) Applicant: OCEANA ENERGY COMPANY, Washington, DC (US)

(72) Inventor: Daniel E. Power, III, Pace, FL (US)

(73) Assignee: Oceana Energy Company, Washington, DC (US)

(*) Notice: Subject to any disclaimer, the term of this patent is extended or adjusted under 35 U.S.C. 154(b) by 106 days.

(21) Appl. No.: 15/767,828

(22) PCT Filed: Oct. 19, 2016

(86) PCT No.: PCT/US2016/057659
§ 371 (c)(1),
(2) Date: Apr. 12, 2018

(87) PCT Pub. No.: WO2017/070180
PCT Pub. Date: Apr. 27, 2017

(65) Prior Publication Data
US 2018/0298876 A1    Oct. 18, 2018

Related U.S. Application Data

(60) Provisional application No. 62/244,846, filed on Oct. 22, 2015.

(51) Int. Cl.
*F03B 17/06* (2006.01)
*F03B 11/06* (2006.01)
*F16C 17/10* (2006.01)

(52) U.S. Cl.
CPC ............ *F03B 17/061* (2013.01); *F03B 11/06* (2013.01); *F16C 17/102* (2013.01);
(Continued)

(58) Field of Classification Search
CPC .......... F05B 2220/7068; F05B 2230/60; F05B 2240/311; F05B 2240/53;
(Continued)

(56) References Cited

U.S. PATENT DOCUMENTS

| 1,937,213 A | 11/1933 | White |
| 3,992,125 A | 11/1976 | Schilling |

(Continued)

FOREIGN PATENT DOCUMENTS

| CN | 1714493 A | 12/2005 |
| CN | 101460736 A | 6/2009 |

(Continued)

OTHER PUBLICATIONS

Chinese Notification of the Second Office Action issued in Chinese Application No. 201580034846.X, dated Mar. 27, 2019.
(Continued)

*Primary Examiner* — Charles Reid, Jr.
(74) *Attorney, Agent, or Firm* — Jones Robb, PLLC

(57) ABSTRACT

A hydroelectric energy system includes a stator including a first plurality of electricity-generating elements. The system also includes a rotor including a second plurality of electricity-generating elements. The rotor is disposed radially outward of an outer circumferential surface of the stator and is configured to rotate around the stator about an axis of rotation. The rotor is a flexible belt structure having a variable thickness and extending along a portion of an axial length of the stator. The system further includes at least one hydrodynamic bearing mechanism configured to support the rotor relative to the stator during rotation of the rotor around the stator. The at least one hydrodynamic bearing mechanism includes a bearing surface made of wood or a composite material.

14 Claims, 6 Drawing Sheets

(52) U.S. Cl.
CPC ... *F05B 2220/7068* (2013.01); *F05B 2230/60* (2013.01); *F05B 2240/311* (2013.01); *F05B 2240/53* (2013.01); *F05B 2250/02* (2013.01); *F05B 2280/4002* (2013.01); *F16C 2212/04* (2013.01); *Y02E 10/28* (2013.01); *Y02E 10/38* (2013.01); *Y02P 70/527* (2015.11)

(58) Field of Classification Search
CPC .......... F05B 2280/4002; F16C 2212/04; F16C 17/102; F03B 11/06; F03B 17/061
USPC ...................................................... 290/43, 54
See application file for complete search history.

(56) References Cited

U.S. PATENT DOCUMENTS

| | | | |
|---|---|---|---|
| 4,163,904 | A | 8/1979 | Skendrovic |
| 4,720,640 | A | 1/1988 | Anderson et al. |
| 6,337,526 | B1 * | 1/2002 | Lin .......................... H02K 1/06 310/254.1 |
| 7,190,087 | B2 | 3/2007 | Williams |
| 2003/0066934 | A1 * | 4/2003 | Bolonkin .................. F03D 5/00 244/153 R |
| 2003/0110615 | A1 | 6/2003 | Ku et al. |
| 2004/0124736 | A1 * | 7/2004 | Gauthier .............. H02K 1/2786 310/413 |
| 2005/0005592 | A1 | 1/2005 | Fielder |
| 2006/0071577 | A1 | 4/2006 | Takeuchi |
| 2009/0096215 | A1 * | 4/2009 | DelVecchio ............ F03B 17/06 290/54 |
| 2009/0096216 | A1 | 4/2009 | Power, III et al. |
| 2009/0278357 | A1 | 11/2009 | Williams |
| 2010/0007148 | A1 | 1/2010 | Davis et al. |
| 2010/0026002 | A1 | 2/2010 | Spooner |
| 2011/0110770 | A1 | 5/2011 | Spooner et al. |
| 2011/0291419 | A1 | 12/2011 | Dunne et al. |
| 2011/0298216 | A1 | 12/2011 | Ives et al. |
| 2011/0298310 | A1 * | 12/2011 | Ross ....................... H02K 41/06 310/20 |
| 2012/0187693 | A1 | 7/2012 | Houvener et al. |
| 2012/0211990 | A1 | 8/2012 | Davey et al. |
| 2012/0313376 | A1 | 12/2012 | Browning, Jr. |
| 2013/0187387 | A1 | 7/2013 | Gilchrist |
| 2013/0261001 | A1 | 10/2013 | Hull et al. |
| 2014/0369841 | A1 | 12/2014 | Duchene et al. |
| 2017/0207680 | A1 | 7/2017 | Power et al. |

FOREIGN PATENT DOCUMENTS

| | | | | |
|---|---|---|---|---|
| CN | 101578448 | A | 11/2009 | |
| CN | 102257267 | A | 11/2011 | |
| CN | 102449299 | A | 5/2012 | |
| CN | 102597498 | A | 7/2012 | |
| CN | 102748200 | A | 10/2012 | |
| DE | 1812374 | A1 * | 6/1970 | ............. B60V 1/043 |
| EP | 2199601 | A1 | 6/2010 | |
| JP | 62-144559 | A | 6/1987 | |

OTHER PUBLICATIONS

Supplementary Partial European Search Report issued in European Application No. 16858113.0, dated Apr. 4, 2019.
Advisory Action issued in U.S. Appl. No. 15/313,288, dated Mar. 14, 2019.
Notice of Allowance issued in U.S. Appl. No. 15/313,288, dated Apr. 8, 2019.
Canadian Examiner Report issued in Canadian Application No. 2,950,002, dated Jun. 5, 2019.
European Search Report issued in European Application No. 16858113.0, dated Jul. 11, 2019.
Chinese Notification of the First Office Action issued in Chinese Application No. 201680061433.5, dated Aug. 2, 2019.
Second Office Action issued in Japanese Patent Application No. 2016-571081, dated Aug. 20, 2019.
International Search Report from corresponding International Patent Application No. PCT/US2016/057659, dated Jan. 6, 2017.
Written Opinion from corresponding International Patent Application No. PCT/US2016/057659, dated Jan. 6, 2017.
International Search Report from related International Patent Application No. PCT/US2015/032948, dated Aug. 27, 2015.
Written Opinion from related International Patent Application No. PCT/US2015/032948, dated Aug. 27, 2015.
Supplementary European Search Report from related European Patent Application No. 15798740.5, dated Jan. 26, 2018.
Non-Final Office Action from co-pending U.S. Appl. No. 15/313,288, dated Jan. 12, 2018.
Chinese Notification of the First Office Action issued in Application No. 201580034846.X, dated Jun. 4, 2018.
Non-final Office Action from co-pending U.S. Appl. No. 15/313,288, dated Jun. 26, 2018.
Final Office Action from co-pending U.S. Appl. No. 15/313,288, dated Dec. 4, 2018.

* cited by examiner

HYDROELECTRIC ENERGY SYSTEMS, AND RELATED COMPONENTS AND METHODS

CROSS-REFERENCE TO RELATED APPLICATION

This application is a National Stage application of International Patent Application No. PCT/US2016/057659, filed internationally on Oct. 19, 2016, which claims priority to U.S. Provisional Patent Application No. 62/244,846, filed Oct. 22, 2015 (now expired) and entitled "Hydroelectric Energy Systems, and Related Components and Methods," the entire content each of which is incorporated by reference herein.

TECHNICAL FIELD

The present disclosure relates generally to hydroelectric energy systems, hydroelectric turbines, and related components and methods.

INTRODUCTION

The section headings used herein are for organizational purposes only and are not to be construed as limiting the subject matter described in any way.

A hydroelectric energy system may utilize a hydroelectric turbine to generate electricity from the current in a moving body of water (e.g., a river or ocean current) or other fluid source. Tidal power, for example, exploits the movement of water caused by tidal currents, or the rise and fall in sea levels due to tides. As the waters rise and then fall, a flow, or fluid current, is generated. The one-directional flow, for example, from a river also creates a current that may be used to generate electricity. And, additional forms of differential pressure, such as, for example, that are created by dams, also can cause water to flow and create water speeds sufficient to enable the conversion of energy associated with the water's flow to other useful forms of energy.

Hydro power, which relies on the natural movement of currents in a body of liquid (e.g., water), is classified as a renewable energy source. Unlike other renewable energy sources, such as wind and solar power, however, hydro power is reliably predictable. Water currents are a source of renewable power that is clean, reliable, and predictable years in advance, thereby facilitating integration with existing energy grids. Additionally, by virtue of the basic physical characteristics of water (including, e.g., seawater), namely, its density (which can be 832 times that of air) and its non-compressibility, this medium holds unique "ultra-high-energy-density" potential in comparison to other renewable energy sources for generating renewable energy. This potential is amplified once the volume and flow rates present in many coastal locations and/or useable locations worldwide are factored in.

Hydro power, therefore, may offer an efficient, long-term source of pollution-free electricity, hydrogen production, and/or other useful forms of energy that can help reduce the world's current reliance upon petroleum, natural gas, and coal. Reduced consumption of fossil fuel resources can in turn help to decrease the output of greenhouse gases into the world's atmosphere.

Electricity generation using hydroelectric turbines (which convert energy from fluid currents) is generally known. An example of such a turbine is described, for example, in U.S. Publication No. 2012/0211990, entitled "Energy Conversion Systems and Methods," which is incorporated by reference in its entirety herein. Such turbines can act like underwater windmills, and have a relatively low cost and ecological impact. In various hydroelectric turbines, for example, fluid flow interacts with blades that rotate about an axis and that rotation is harnessed to thereby produce electricity or other forms of energy.

Hydroelectric energy systems, however, can pose various challenges relating to the stress and/or strain on the various components of the system resulting from the interaction of the relatively strong forces associated with fluid flow (e.g., moving currents which are often intermittent and turbulent). Additional challenges also may arise with assembling such complex systems at an installation location.

It may, therefore, be desirable to provide a hydroelectric energy system having a robust configuration that can withstand the strong, intermittent, and turbulent forces associated with fluid flow interacting therewith. It also may be desirable to provide a hydroelectric energy system having a design which allows efficient assembly of the system on-site to reduce the expense of shipping the assembly from a manufacturing plant to the installation location, which in some cases may be relatively remote or difficult to access by normal large freight shipping. Other improvements to hydroelectric energy systems also are needed to improve long-term reliability, ease of manufacture, and to address problems inherent with operating in underwater environments.

SUMMARY

The present disclosure solves one or more of the above-mentioned problems and/or achieves one or more of the above-mentioned desirable features. Other features and/or advantages may become apparent from the description which follows.

In accordance with various exemplary embodiments of the present disclosure, a hydroelectric energy system may include a stator comprising a first plurality of electricity-generating elements. The system may also include a rotor comprising a second plurality of electricity-generating elements. The rotor may be disposed radially outward of an outer circumferential surface of the stator and configured to rotate around the stator about an axis of rotation. The rotor may be a flexible belt structure having a variable thickness and extending along a portion of an axial length of the stator. The system may further include at least one hydrodynamic bearing mechanism configured to support the rotor relative to the stator during rotation of the rotor around the stator. The at least one hydrodynamic bearing mechanism may include a bearing surface made of wood or a composite material.

In accordance with various additional exemplary embodiments of the present disclosure, a hydroelectric energy system may include a stator comprising a first plurality of electricity-generating elements. The system may also include a rotor comprising a second plurality of electricity-generating elements. The rotor may be disposed radially outward of an outer circumferential surface of the stator and configured to rotate around the stator about an axis of rotation. The rotor may be a flexible belt structure having a variable radial thickness in an axial direction of the rotor. The system may further include at least one blade portion extending radially inward with respect to the rotor and at least one blade portion extending radially outward with respect to the rotor. The at least one radially outward extending blade portion may extend radially from a base, the base extending axially along and being fastened to a surface of the rotor.

In accordance with various further exemplary embodiments of the present disclosure, a method of manufacturing a hydroelectric energy system may include assembling a concrete stator. The method may also include sliding a plurality of composite arcs forming a rotor around a radially outer circumferential surface of the assembled stator, wherein sliding the composite arcs comprises sliding the arcs over a plurality of teeth on the stator. The method may further include bolting the teeth to the concrete stator.

Additional objects and advantages will be set forth in part in the description which follows, and in part will be obvious from the description, or may be learned by practice of the present teachings. At least some of the objects and advantages of the present disclosure may be realized and attained by means of the elements and combinations particularly pointed out in the appended claims.

It is to be understood that both the foregoing general description and the following detailed description are exemplary and explanatory only and are not restrictive of the present disclosure and claims, including equivalents. It should be understood that the present disclosure and claims, in their broadest sense, could be practiced without having one or more features of these exemplary aspects and embodiments.

BRIEF DESCRIPTION OF THE DRAWINGS

The accompanying drawings, which are incorporated in and constitute a part of this specification, illustrate some exemplary embodiments of the present disclosure and together with the description, serve to explain certain principles. In the drawings

DESCRIPTION OF EXEMPLARY EMBODIMENTS

In accordance with one or more exemplary embodiments of the present disclosure, energy in a fluid flow can be directly converted to electricity by the use of magnets embedded in a rotor, wherein the rotor includes an inner rim and at least one hydrofoil blade. The rotor can be supported such that it rotates around an outside surface of a stator, which may be embedded with a core with windings. The fluid flow acts on the at least one blade thereby causing the rotor to rotate, which in turn causes the rotor magnets to move past the stator windings to generate electricity in the core.

The rotor can be configured, for example, as a flexible belt structure that sits radially outward of the stator. In accordance with various exemplary embodiments, the rotor may have a variable thickness, and may extend along a portion of an axial length of the stator. For example, in various embodiments, the rotor may have an arcuate outer surface profile to minimize non-productive drag in the fluid flow over the rotor.

As used herein, the term flexible generally refers to the capability of the rotor belt to bend without breaking. Thus, in accordance with various exemplary embodiments of the present disclosure, the rotor may be considered as having an amount of flex such that the rotor may take the shape of a cylindrical belt-like structure without breaking.

Sets of hydrodynamic bearings can be positioned and secured between the rotor and stator to separate those components during rotation of the rotor and also to prevent the rotor from being forced axially out of alignment with the stator or otherwise off of the stator, by the fluid flow. In accordance with various exemplary embodiments, one or more of the sets of hydrodynamic bearings may include a bearing surface made of wood or a wood composite.

Hydroelectric Energy System Configurations

Figure 1:
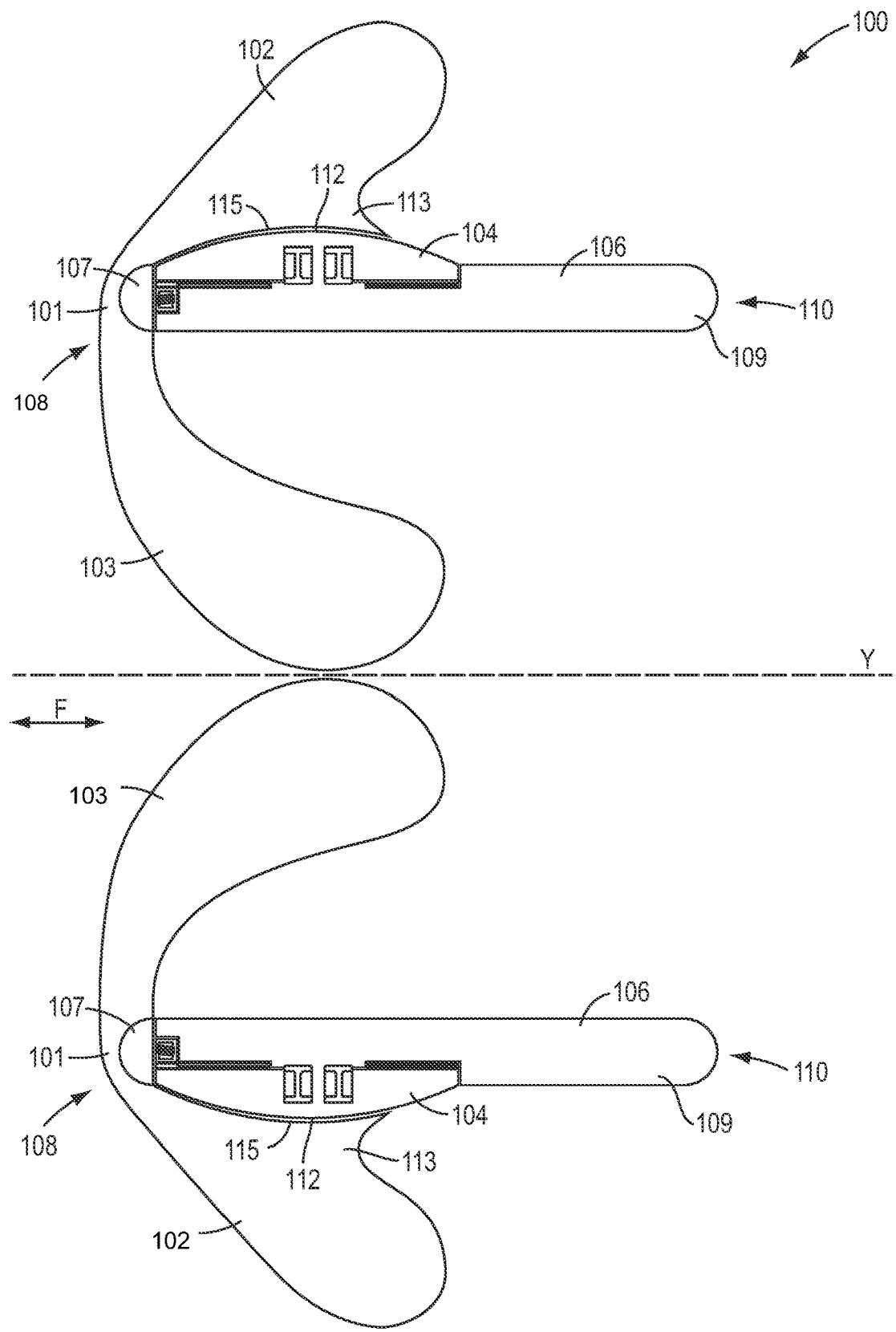
FIG. 1 shows cross-sectional views of an exemplary embodiment of a hydroelectric energy system in accordance with the present disclosure, showing both the upper half and lower half of the cross-section.

With reference now to FIG. 1, an exemplary embodiment of a hydroelectric energy system 100 in accordance with the present disclosure is shown. The hydroelectric energy system 100 includes a rotor 104 disposed radially outward of a stator 106. In this arrangement, one or more blades (hydrofoils) 101 can extend radially inward and/or radially outward, i.e., relative to a rotational axis Y. For example, with reference to the exemplary embodiment of FIG. 1, there may be a radially inward extending blade portion 103 and a radially outward extending blade portion 102. Both blade portions 102, 103 are arranged in the fluid flow F (designated by the arrows in FIG. 1) to thereby cause the rotor 104 to rotate relative to the stator 106 about the central axis Y. In various exemplary embodiments a plurality of blades 101 can be mounted around the circumference of the rotor 104, for example, at uniform intervals about the circumference.

As described, for example, in U.S. International Patent Application No. PCT/US2015/032948, entitled "Hydroelectric Turbines, Anchoring Structures, and Related Methods of Assembly," which is incorporated by reference in its entirety herein. Mounting the rotor 104 outside of the stator 106 may, for example, permit the rotor 104, or at least the portions of the rotor 104 between mounting regions for the blades 101 to be configured as a semi-rigid belt that provides some flex over a large diameter. In this manner, the rotor 104 may ride on the outer surface of the stator 106 much like a belt or rope over a pulley (except, as explained below, spaced a small distance from the stator as a result of the bearing systems as it rotates), thereby allowing the rotor 104 to bend/flex to some degree as it rotates. In various exemplary embodiments, for example, the rotor 104 may be made from Kevlar® or a carbon-fiber material and the stator 106 may be cast concrete.

The rotor 104 illustrated in the embodiment of FIG. 1 may, therefore, take advantage of the inwardly disposed stator 106 to support (e.g., against the effects of gravity) the rotor 104 in a substantially closed loop configuration. In contrast, in a configuration wherein the rotor is disposed inward of the stator, the rotor may need to be more rigid in order to maintain the outer surface of the rotor adjacent the inner surface of the stator. Thus, the rotor 104 in the configuration illustrated in FIG. 1 may benefit from reduced weight, less materials, and/or use of less expensive materials as a result of the reduced support requirements for the rotor.

In addition, to improve the compressive strength of the rotor 104, the rotor 104 may have a variable thickness. Such a configuration may, for example, minimize unproductive drag in the fluid flowing over an outside surface of the rotor 104. For example, as illustrated in the embodiment of FIG. 1, the rotor 104 may have an arcuate outer surface profile to minimize non-productive drag in the fluid flow over the rotor 104. In other words, the outer surface profile of the rotor 104, in an axial cross-section, may be arc-shaped.

As also shown in FIG. 1, in various exemplary embodiments, the energy system 100 may further include diversion arcs 107 at a first end 108 of the system 100 to also help minimize the non-productive drag. The diversion arcs 107 may, for example, be placed between the blades 101 such that an arc 107 is fastened on either side of each blade 101. In this manner, the fluid flowing toward the first end 108 of the energy system 100 (e.g., the water coming toward the system 100) will be diverted to either side of the system 100. In the same manner, an end portion 109 of the stator 106 may also have a rounded surface profile to divert fluid flowing toward a second and opposite end 110 of the energy system 100.

The blades 101 of the energy system 100 can be attached toward the front rim of the rotor 104 (e.g., along the first end 108 of the system 100) and blade portions can extend in substantially opposite directions (e.g., radially away from the center of the rotor 104 (radially outward) and radially toward the center of the rotor 104 (radially inward)). As illustrated in FIG. 1, for example, the rotor 104 can have blades 101 with a radially inward extending blade portion 103 and a radially outward extending blade portion 102 attached thereto. The arrangement of the rotor 104 radially outward of the stator 106 may facilitate the arrangement of the radially inward and outward extending blade portions 102, 103, while also placing the blades 101 in a position to sweep a maximum arc of current. Thus, the blade portions 102, 103 may collect flow energy from the fluid flow F in sweeps away from the central axis of rotation Y and in sweeps toward the central axis of rotation Y, respectively. This may help to balance the forces acting on the rotor, thereby reducing stresses on the rotor 104 and allowing for the use of less material in both the rotor 104 and the blades 101.

In various exemplary embodiments, the blade portions 102 can be made integral with the blade portions 103 to form a single blade (hydrofoil) 101. For example, each blade portion 102, 103 may be molded from a composite material, such as, for example, a carbon-fiber-reinforced plastic to form a single blade 101. As illustrated in FIG. 1, in accordance with various embodiments, to increase the strength of the blades 101, the radially outward extending blade portion 102 of each blade 101 may be molded to have a pedestal-like shape such that the blade portion 102 may rest on the arc-shaped rotor 104. In other words, the blade portion 102 may have a base 113 having a surface 115 that extends axially along and lies back on the rotor belt 104 and which is fastened to the rotor 104 along a surface 112 of the rotor 104 via, for example, bolts and/or an epoxy material.

In accordance with various additional embodiments, to further balance the forces on the two blade portions 102, 103 (which may reduce the tendency of the blade portions 102, 103 to torque the rotor 104), the radially inward extending blade portion 103 may be longer than the outwardly extending blade portion 102. In other words, since the radially outwardly extending blade portion 102 has a greater sweep than the inwardly extending blade portion 103, the length of the blade portion 103 is extended (relative to the blade portion 102) to help balance the forces from the fluid flow on the blade portions 102, 103.

Accordingly, because the stator 106 supports the rotor 104 and the blades 101 on the rotor 104 are configured in a balanced arrangement (e.g., radially inward and radially outward), as illustrated in FIG. 1, the amount of material (e.g., relatively expensive composite material) needed to build the rotor 104 can be reduced, which may also reduce fabrication and assembly costs, as well as facilitate installation of the energy system 100.

Figure 2:
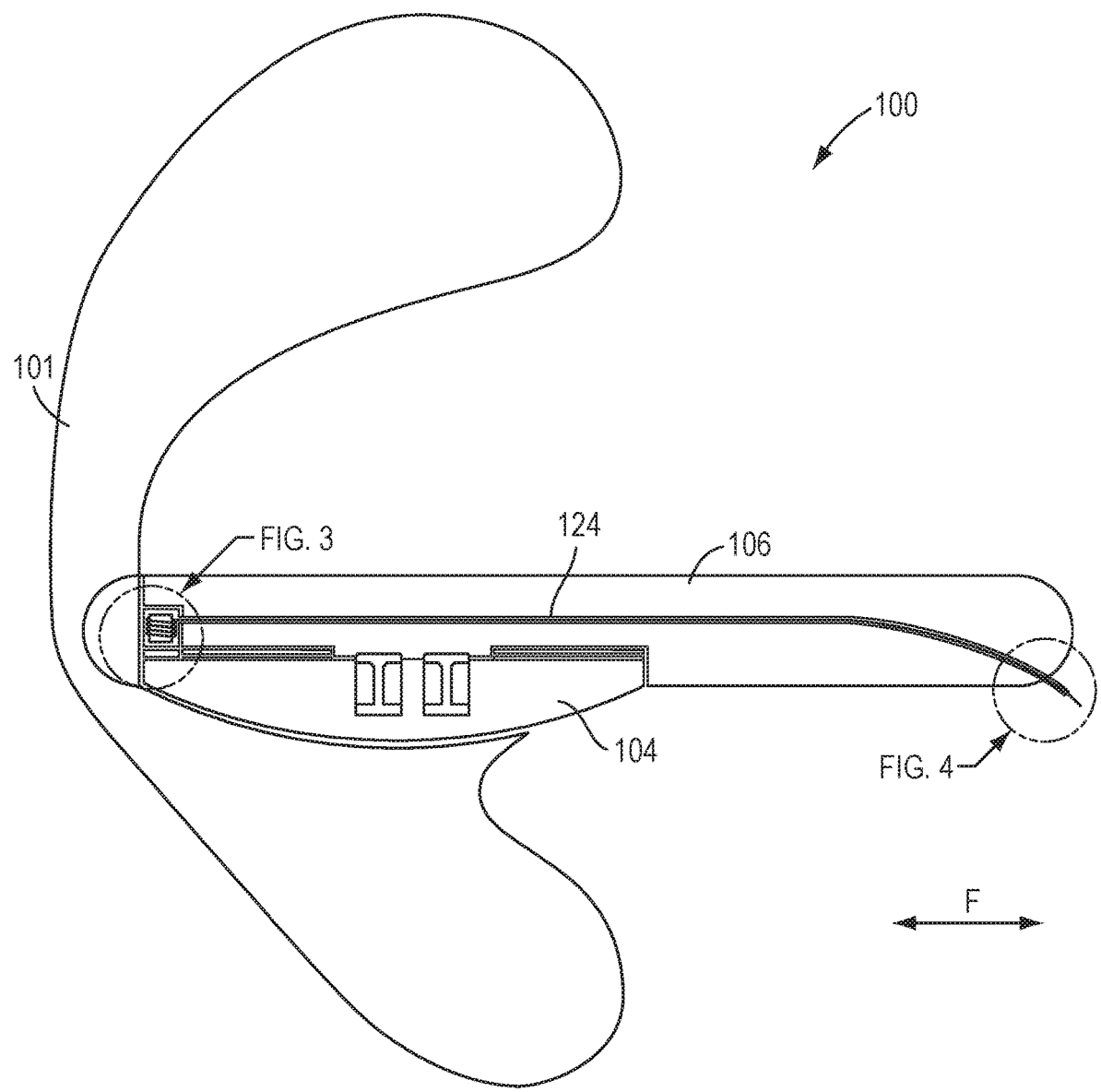
FIG. 2 shows the lower half of the cross-section of the hydroelectric energy system of FIG. 1.
Figure 3:
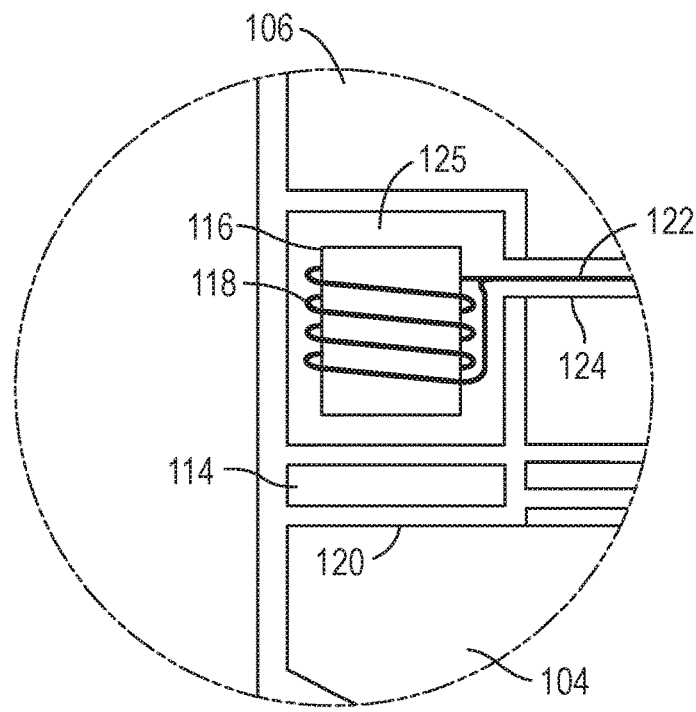
FIG. 3 is an enlarged, detailed view of an exemplary embodiment of an energy-generation element of the hydroelectric energy system of FIG. 1.
Figure 4:
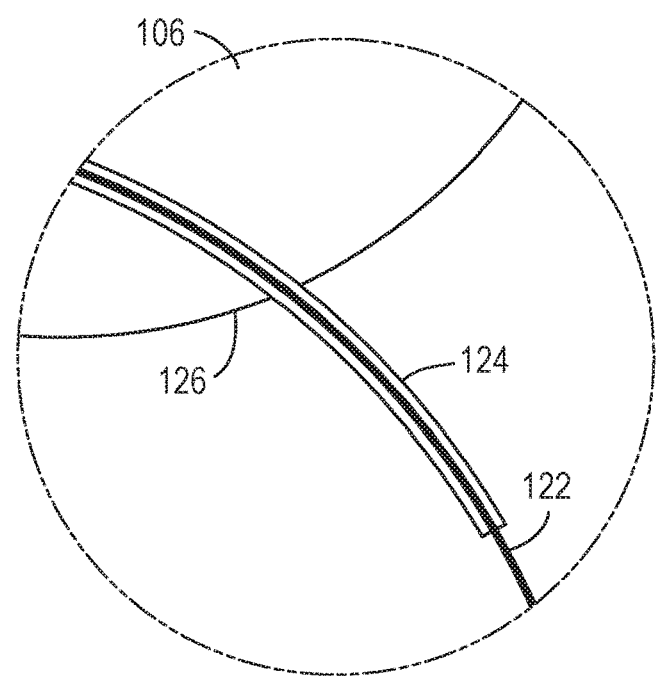
FIG. 4 is an enlarged, detailed view of an exemplary embodiment of a conduit housing a cable for transmitting electricity from the hydroelectric energy system of FIG. 1.

With reference now to FIGS. 2-4, in various exemplary embodiments, the rotor 104 may include one or more electricity-generating magnets 114, which are disposed with respect to one or more corresponding electricity-generating elements 116 of the stator 106 when installed in the energy system 100. Although not shown, in various additional embodiments, the stator 106 may include one or more electricity-generating magnets disposed with respect to one or more corresponding electricity-generating elements of the rotor 104. As illustrated in FIG. 3, the electricity-generating element(s) 116 may, for example, comprise at least one coil 118 with windings configured to generate electricity in response to rotational movement of electricity-generating magnets 114 on the rotor 104.

As further shown in FIG. 3, the rotor 104, for example, may include one or more magnets 114 for generating electricity, which are radially aligned with, but spaced from, the at least one coil 118 of the stator 106. The magnets 114 can be mechanically attached to an inner circumferential surface 120 of the rotor 104 or can be disposed within an interior of the rotor 104 proximal to the inner surface 120. Accordingly, fluid flow interacting with the blades 101 causes the rotor 104 to rotate over the outside surface of the stator 106. And, the rotation of magnets 114 in the rotor 104 induces a voltage in the coils 118 disposed in the stator 106 (e.g., in a stator ring assembly 125). The coils 118 may be connected together in such a way so as to produce electricity of a desired voltage and/or current. The resulting electricity can then be transmitted via electrical transmission conduits 122 (e.g., cables) for subsequent use or storage, for example, via one or more transmission lines or conductors connected to a land-based electrical grid.

In various embodiments, for example, the concrete cylinder of the stator 106 may be cast with a passage, such as, for example, a flexible, plastic tube 124, to run each conduit 122 from the stator coils 118 to the land-based grid. As shown in FIGS. 2-4, each transmission conduit 122 may run from the stator coils 118, through the stator 106, and exit the stator 106 at a bottom portion 126 of the end portion 109 of the stator 106. In this manner, the conduits 122 are routed through the stator 106 and are kept away from the rotating parts of the energy system 100 and the fluid flow F. Furthermore, the plastic tubes 124 provide a smooth transition between the rigid material (e.g., concrete) of the stator 106 and the fluid in which the energy system 100 is deployed, while also routing each conduit 122 down to the ground in a controlled manner.

Figure 5:
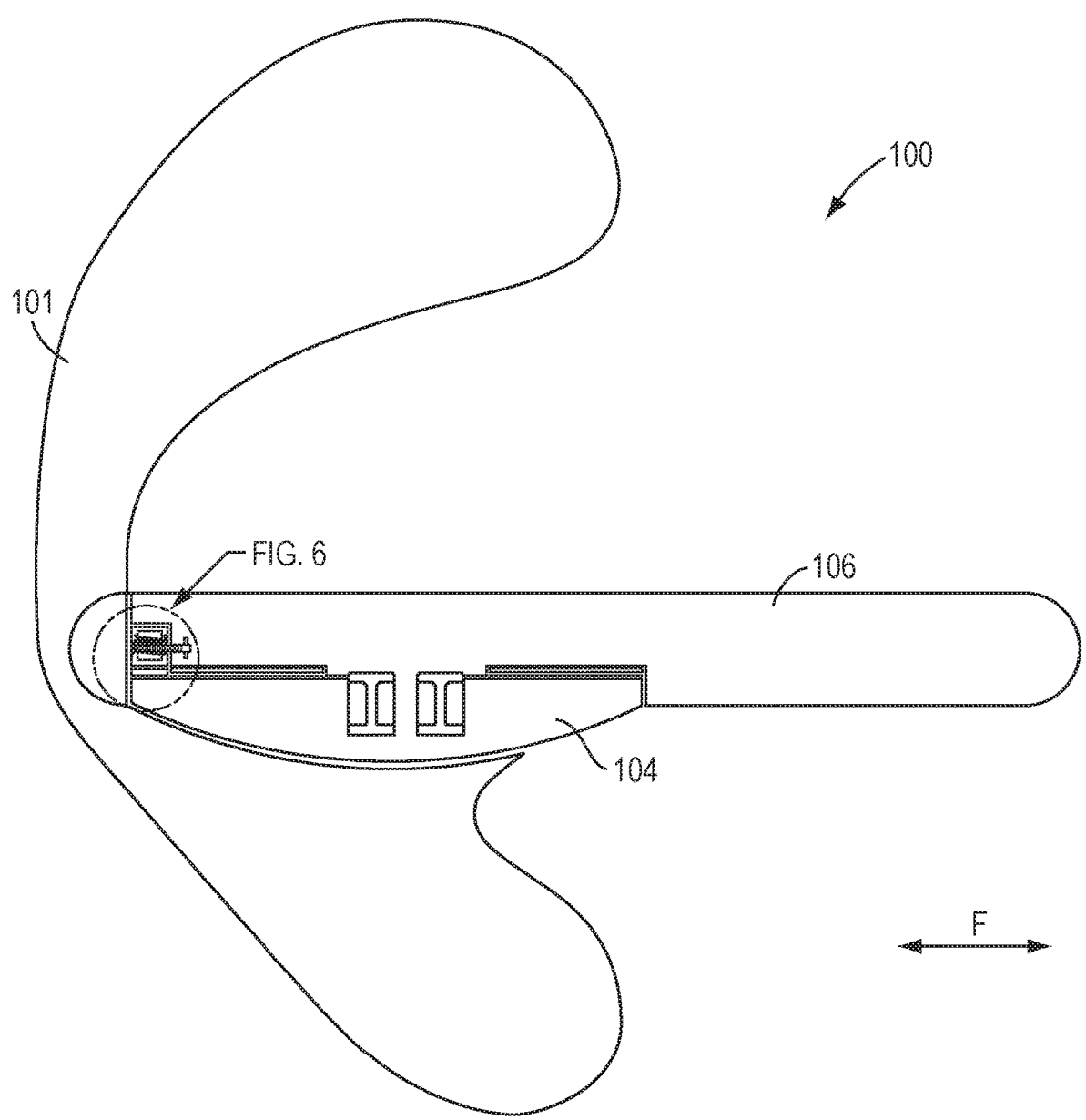
FIG. 5 shows the lower half of the cross-section of the hydroelectric energy system of FIG. 1.
Figure 6:
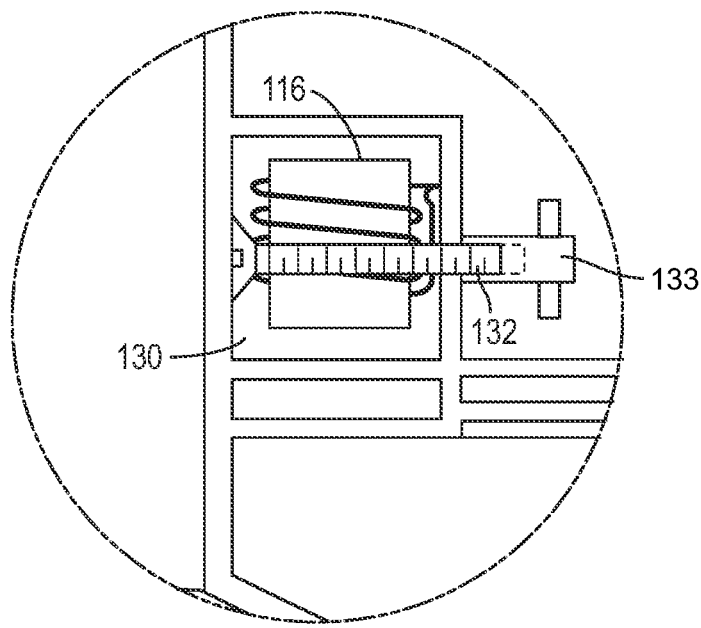
FIG. 6 is an enlarged, detailed view of an exemplary embodiment of a stator ring assembly of the hydroelectric energy system of FIG. 1.

As illustrated in FIGS. 5 and 6, the electricity-generating elements 116 of the stator 106 may be housed in a stator ring assembly 130, such as, for example, a copper ring that is dipped in a protective coating (e.g., to protect the ring from the corrosive environment in which the system 100 is deployed). The stator ring assembly 130 may be fastened to the stator 106 via bolts 132. In accordance with various embodiments, for example, the stator ring assembly 130 may be preassembled for fastening to the concrete stator 106, and the whole stator assembly (stator 106 and ring 130) may be cast into a composite surround with holes 133 for insertion of the bolts 132.

Figure 8:
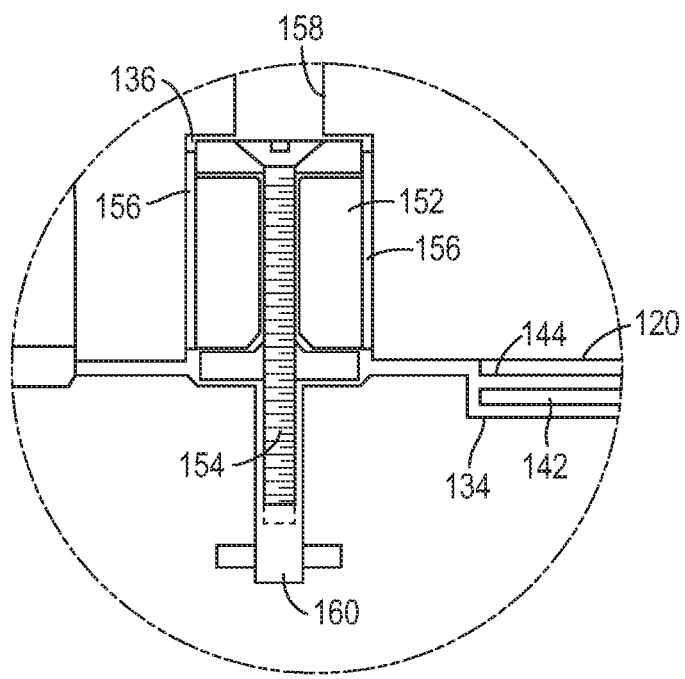
FIG. 8 is an enlarged, detailed view showing exemplary embodiments of hydrodynamic bearings of the hydroelectric energy system of FIG. 1.
Figure 7:
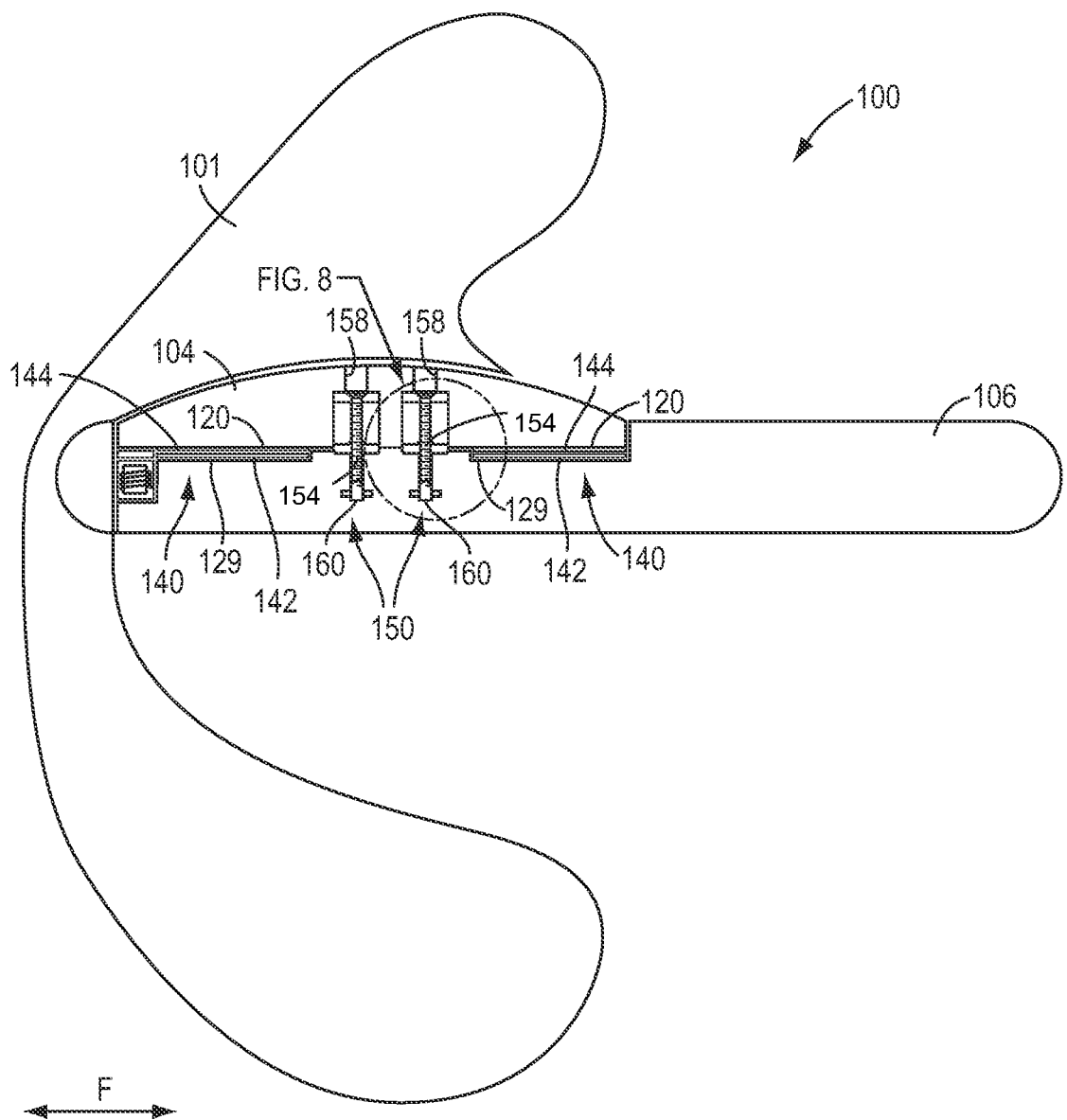
FIG. 7 shows the lower half of the cross-section of the hydroelectric energy system of FIG. 1.

With reference now to FIGS. 7 and 8, in various exemplary embodiments, one or more sets of hydrodynamic bearings 140 can be disposed for radially aligning the rotor 104 relative to the stator 106. Various embodiments, for example, contemplate using water lubricated bearings made of wood, such as, for example, as commercially available from Lignum-Vitae North America of Powhatan Va., or a composite material, such as, for example, Vesconite, which rub on a carbon fiber or stainless steel surface, as the radial hydrodynamic bearings between the rotor 104 and the stator 106. As illustrated in FIGS. 7 and 8, such embodiments contemplate, for example, using strips of wood (e.g., Lignum-Vitae) or composite 142 positioned along an outer circumferential surface 129 of the stator 106, and which are arranged to rub against a bearing surface, such as, for example, the carbon fiber of the inner circumferential surface 120 of the rotor 104 (i.e., the strips 142 rub directly against the carbon fiber of the rotor 104), or a stainless steel material 144 positioned along the inner circumferential surface 120. In various exemplary embodiments, as shown in FIG. 8, the strips 142 are pushed into slots 134 within the concrete of the stator 106. In this manner, the fluid (e.g., sea water) between the rotor 104 and stator 106 may provide a hydrodynamic bearing effect (i.e., between the surfaces of the strips 142 and the bearing surface) to contain the radial load of the energy system 100.

In a similar manner, in various additional exemplary embodiments, one or more sets of hydrodynamic bearings 150 can be disposed for maintaining relative axial positioning of the rotor 104 relative to the stator 106. Similar to the radial bearings, various exemplary embodiments contemplate using water lubricated bearings made of wood (e.g., a wood as commercially available from Lignum-Vitae North America) or composite materials (e.g., Vesconite), which rub on a bearing surface, such as, for example, a carbon fiber or stainless steel surface, as the axial hydrodynamic bearings between the rotor 104 and the stator 106. As illustrated in FIGS. 7 and 8, such embodiments contemplate using a pattern of intermeshing teeth 152 to contain the axial forces of the energy system 100. A row of wood (e.g., Lignum-Vitae) or composite teeth 152 may, for example, be affixed (e.g., via a bolt 154) to the outer circumferential surface 129 of the stator 106 and reach up into slots 136 formed in the inner circumferential surface 120 of the rotor 104. In various embodiments, the teeth 152 may rub directly against the carbon fiber of the rotor 104 (i.e., within the slots 136). And, in various additional embodiments, the slots 136 may be fitted with an additional bearing surface, such as, for example, stainless steel rings 156 configured to slide over the sides of the teeth 152. In this manner, the fluid (e.g., sea water) within each slot 136 may provide a hydrodynamic bearing effect to contain the axial load of the energy system 100.

As shown perhaps best in FIG. 7, embodiments of the present disclosure contemplate positioning the axial hydrodynamic bearings 150 within the rotor belt 104 within an area of increased thickness of the arc-shaped belt. Positioning the bearings 150 in such a manner (i.e., instead of both at the front and back of the belt 104) may, for example, improve the strength of the bearings 150 and therefore the axial alignment of the energy system 100. Placement of the bearings 150, for example, within a central portion of the rotor 104 (i.e., where the rotor 104 is thickest) may, therefore, help to increase the overall strength of the system 100.

As would be understood by those of ordinary skill in the art, the sets of hydrodynamic bearings 140 and 150 shown and described with respect to FIGS. 7 and 8 are exemplary only and may have various arrangements and configurations, and/or may be replaced or used in conjunction with any known bearing mechanism and/or system. Other types, configurations, and arrangements of bearings that support the rotor 104 with respect to the stator 106 are also possible, for example, as described in PCT/US2015/032948, incorporated by reference above.

Those of ordinary skill in the art would also understand that the energy systems 100 illustrated in FIGS. 1-8 and described above are exemplary only, and that the blades 101, rotors 104, and stators 106 may have various configurations, dimensions, shapes, and/or arrangements without departing from the scope of the present disclosure and claims. Furthermore, it would be understood by those of ordinary skill in the art that the energy systems of the present disclosure may be configured to operate with various and changing directions of fluid flow (as illustrated by the multi-directional arrows illustrating the fluid flow F in the figures), and are configured to operate with both the ebb and flow of, for example, tidal currents, as well as currents coming from only one direction, such as, for example, river currents. For example, the shape of the blades 101 may be different for systems used in different environments (e.g., oceans vs. rivers), so as to optimize the potential energy collection from the two-directional and one-directional flows.

Methods of Assembling Hydroelectric Energy Systems

As described in PCT/US2015/032948, incorporated by reference above, the stator 106 and the rotor 104 may be manufactured at a plant and be shipped from the manufacturing plant to the installation location for assembly with a bridge (not shown) and/or anchoring system (not shown).

In various embodiments, for example, the rotor 104 can be formed from a plurality of arcuate segments assembled together onsite around the outer circumference 129 of the concrete cylinder forming the stator 106. The blades 101 can be attached toward the front rim of the rotor 104 (e.g., along the first end 108 of the system 100). In various embodiments, the blades 101 may be attached to the rotor via bolts, but screws, rivets, nails, or any other connection mechanism may be used to attach the blades 101 to the rotor 104. As above, in various additional embodiments, one or more of the blades 101 may include a radially outward extending blade portion 102 with a pedestal-like shape, such that the blade portion 102 rests on the arc-shaped rotor 104, thereby allowing the blades 101 to carry forces more extensively into the rotor 104. In other words, the blade portion 102 may have a base 113 having a surface 115 that extends axially along and lies back on the rotor belt 104, and which is fastened to the rotor 104 along a surface 112 of the rotor 104 via, for example, bolts and/or an epoxy material.

Accordingly, in accordance with various embodiments, a method for manufacturing and installing a hydroelectric energy system, such as, for example, the energy system 100 can include assembling a plurality of pre-fabricated rotor segments (not shown) (i.e., at a manufacturing plant) on the stator 106 as described in PCT/US2015/032948. For example, the rotor segments may be substantially arcuate segments that fit together on an outer circumferential surface 129 of the stator 106 to form the rotor 104 of the energy system 100. As above, the rotor 104 can have a flexible belt structure that is radially spaced from the outer circumferential surface 129 of the stator 106 and centered with respect to the stator 106. The rotor 104 may, for example, be made of a composite material encapsulating the electricity generating components (i.e., magnets 114), and an electrical transmission conduit 122 may be run through the stator 106 for conveying generated electricity from the energy system 100 for use or storage (see FIGS. 2-4).

In various embodiments, for example, the segments (or composite arcs) may be fabricated with preformed slots 136 for the teeth 152 of the axial bearing system 150 (see FIG. 8). In this manner, as the belt structure of the rotor 104 is installed over the stator 106, the segments can slide over the teeth 152. Once the belt is in place around the stator 106 (i.e., forming the rotor 104), the teeth 152 can be attached to the concrete of the stator 106 via bolts 154 (e.g., flat head bolts) to secure the axial bearing system 150. To facilitate the insertion of the bolts 154, in accordance with various exemplary embodiments, the rotor 104 may be fabricated to include access holes 158 and the stator 106 may be cast to include sockets 160.

As would be understood by those of ordinary skill in the art, although the present disclosure is generally described with reference to generating energy via tidal currents, the energy systems and features disclosed herein are applicable to a wide range of fluid flow applications including, but not limited to, ocean and tidal environments, rivers, and streams, as well as fluids other than water.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be included in the second embodiment.

It is noted that, as used herein, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the disclosure. For example, spatially relative terms—such as "upstream," downstream," "beneath," "below," "lower," "above," "upper," "forward," "front," "behind," and the like—may be used to describe one element's or feature's relationship to another element or feature as illustrated in the orientation of the figures. These spatially relative terms are intended to encompass different positions and orientations of a device in use or operation in addition to the position and orientation shown in the figures. For example, if a device in the figures is inverted, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly.

Further modifications and alternative embodiments will be apparent to those of ordinary skill in the art in view of the disclosure herein. For example, the devices may include additional components that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present disclosure.

It is to be understood that the particular examples and embodiments set forth herein are non-limiting, and modifications to structure, dimensions, materials, and methodologies may be made without departing from the scope of the present disclosure. Other embodiments in accordance with the present disclosure will be apparent to those skilled in the art from consideration of the specification and practice of the invention disclosed herein. It is intended that the specification and examples be considered as exemplary only, with being entitled to their full breadth of scope, including equivalents.

What is claimed is:

1. A hydroelectric energy system comprising:
    a stator comprising a first plurality of electricity-generating elements;
    a rotor comprising a second plurality of electricity-generating elements, wherein the rotor is disposed radially outward of an outer circumferential surface of the stator and configured to rotate around the stator about an axis of rotation, wherein the rotor is a flexible belt structure having a variable radial thickness in an axial direction of the rotor; and
    at least one blade portion extending radially inward with respect to the rotor and at least one blade portion extending radially outward with respect to the rotor, wherein the at least one radially outward extending blade portion extends radially from a base, the base extending axially along and being fastened to a surface of the rotor.

2. The hydroelectric energy system of claim 1, wherein the first plurality of electricity-generating elements comprises coils, and wherein the second plurality of electricity-generating elements comprises magnets.

3. The hydroelectric energy system of claim 1, wherein the at least one radially inward extending blade portion is longer than the at least one radially outward extending blade portion.

4. The hydroelectric energy system of claim 1, wherein the rotor is configured to be rotated relative to the stator by a fluid flow moving in a direction of the axis of rotation.

5. The hydroelectric energy system of claim 1, wherein the rotor is in tension and the stator is in compression.

6. The hydroelectric energy system of claim 1, further comprising at least one hydrodynamic bearing mechanism configured to support the rotor relative to the stator during rotation of the rotor around the stator.

7. The hydroelectric energy system of claim 6, wherein the at least one hydrodynamic bearing mechanism comprises at least one radial hydrodynamic bearing and at least one axial hydrodynamic bearing.

8. The hydroelectric energy system of claim 7, wherein the rotor has an inner circumferential surface facing the outer circumferential surface of the stator, and wherein the at least one radial hydrodynamic bearing comprises a strip of wood or composite material within a slot in the outer circumferential surface of the stator and a stainless steel or carbon fiber material positioned opposite the strip on the inner circumferential surface of the rotor.

9. The hydroelectric energy system of claim 7, wherein the rotor has an inner circumferential surface facing the outer circumferential surface of the stator, and wherein the at least one axial hydrodynamic bearing comprises wood or composite teeth affixed to the outer circumferential surface of the stator, which reach up into slots formed in the inner circumferential surface of the rotor, and a stainless steel or carbon fiber material positioned within each slot.

10. The hydroelectric energy system of claim 7, wherein the at least one axial hydrodynamic bearing is positioned within the thickest portion of the rotor.

11. The hydroelectric energy system of claim 7, wherein each of the at least one radial and axial hydrodynamic bearings comprises a bearing surface made of wood or a composite material.

12. The hydroelectric energy system of claim 1, wherein an outer surface profile of the rotor in an axial cross-section is arc-shaped.

13. The hydroelectric energy system of claim 1, further comprising at least one electrical transmission conduit configured to transmit electricity from the electricity generating elements to a land-based electrical grid, wherein the stator comprises a passage for each conduit to run the conduit from the electricity generating elements to the land-based electrical grid.

14. A method of manufacturing a hydroelectric energy system, the method comprising:
   assembling a concrete stator;
   sliding a plurality of composite arcs forming a rotor around a radially outer circumferential surface of the concrete stator, wherein sliding the composite arcs comprises sliding the composite arcs over a plurality of teeth on the concrete stator; and
   bolting the teeth to the concrete stator.

* * * * *